US010789079B2

(12) United States Patent
Sambasivam et al.

(10) Patent No.: US 10,789,079 B2
(45) Date of Patent: Sep. 29, 2020

(54) TRIGGERING USER AID BASED ON USER ACTIONS AT INDEPENDENT LOCATIONS

(71) Applicant: Microsoft Technology Licensing, LLC, Redmond, WA (US)

(72) Inventors: Vaidyaraman Sambasivam, Redmond, WA (US); Nagendra V Kolluru, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 329 days.

(21) Appl. No.: 15/470,850

(22) Filed: Mar. 27, 2017

(65) Prior Publication Data

US 2018/0276006 A1 Sep. 27, 2018

(51) Int. Cl.
*G06F 17/00* (2019.01)
*G06F 9/451* (2018.01)
(Continued)

(52) U.S. Cl.
CPC ............ *G06F 9/453* (2018.02); *G06Q 30/02* (2013.01); *G06Q 30/0201* (2013.01);
(Continued)

(58) Field of Classification Search
CPC .... G06F 9/453; G06Q 30/02; G06Q 30/0201; G06Q 30/0261; G06Q 30/0639;
(Continued)

(56) References Cited

U.S. PATENT DOCUMENTS 7,734,513 B2 * 6/2010 Bonner ............... G01S 5/14
370/406
7,930,204 B1 * 4/2011 Sharma ............ G06Q 30/0203
705/7.32
(Continued)

FOREIGN PATENT DOCUMENTS

WO 2005064515 A1 7/2005

OTHER PUBLICATIONS

Subramanian Gopalaratnam, "In-store analytics: tracking real-world customers just like online shoppers", http://www.in.techradar.com/news/world-of-tech/future-tech/In-store-analytics-tracking-real-world-customers-just-like-online-shoppers/articleshow/46398563.cms, Published on: Feb. 27, 2015, 8 pages.

(Continued)

*Primary Examiner* — Cesar B Paula
*Assistant Examiner* — James H. Blackwell
(74) *Attorney, Agent, or Firm* — Watson Patents, PLC; Vladan M. Vasiljevic (57) ABSTRACT

User action data, quantifying the actions of the user in a physical establishment, can be obtained through various forms of tracking and monitoring that can be implemented by software or hardware infrastructure supported by physical establishment, and agreed to by the user. Such user action data is obtained from multiple physical establishments, which, in combination with tracking of user actions in an online environment, provides a more accurate basis on which to determine a user's intent to act upon an item, a (Continued)

user's affinity for items associated with a specific entity, or combinations thereof. User intent can be quantified in terms of predetermined levels of intent. User content and user entity affinity provide a more accurate basis on which to proactively offer user aid to facilitate the user's acquiring of items, or otherwise make more efficient the user's activities with respect to such items.

20 Claims, 4 Drawing Sheets (51) Int. Cl.
  *G06Q 30/06*     (2012.01)
  *H04W 4/029*    (2018.01)
  *G06Q 30/02*     (2012.01)
  *H04L 29/08*     (2006.01)

(52) U.S. Cl.
  CPC ......... *G06Q 30/06* (2013.01); *G06Q 30/0625* (2013.01); *H04L 67/22* (2013.01); *H04W 4/029* (2018.02)

(58) Field of Classification Search
  CPC .............. G06Q 30/0224; G06Q 30/06; G06Q 30/0625; H04W 4/02; H04W 4/029; H04L 67/22
  See application file for complete search history.

(56) References Cited

U.S. PATENT DOCUMENTS

| | | | | |
|---|---|---|---|---|
| 8,050,984 B2* | 11/2011 | Bonner | .............. | G06Q 30/0261 705/26.7 |
| 10,262,331 B1* | 4/2019 | Sharma | ................. | H04W 4/029 |
| 2002/0029172 A1* | 3/2002 | I'Anson | ................. | G06Q 30/02 705/26.62 |
| 2002/0113123 A1* | 8/2002 | Otto | ................... | G06K 17/0022 235/381 |
| 2003/0074267 A1* | 4/2003 | Acharya | ................ | G06Q 30/02 705/26.8 |
| 2004/0111454 A1* | 6/2004 | Sorensen | ............... | G06Q 30/02 708/200 |
| 2007/0182555 A1* | 8/2007 | Walker | .................. | G06Q 10/08 340/572.1 |
| 2008/0189170 A1* | 8/2008 | Ramachandra | ........ | G06Q 30/02 705/7.29 |
| 2009/0224977 A1* | 9/2009 | Bonner | ..................... | G01S 5/02 342/378 |
| 2011/0106624 A1* | 5/2011 | Bonner | .............. | G06Q 30/0261 705/14.58 |
| 2012/0317066 A1* | 12/2012 | Miyazaki | ............... | G06Q 50/10 706/46 |
| 2013/0041837 A1* | 2/2013 | Dempski | .............. | G06Q 10/101 705/345 |
| 2013/0204737 A1* | 8/2013 | Agarwal | ............ | G06Q 30/0282 705/26.7 |
| 2014/0058841 A1* | 2/2014 | Getchius | ................ | G06Q 30/02 705/14.58 |
| 2014/0222562 A1 | 8/2014 | Akgul et al. | | |
| 2014/0365273 A1* | 12/2014 | Hurewitz | ........... | G06Q 30/0643 705/7.29 |
| 2015/0120412 A1 | 4/2015 | Deshpande et al. | | |
| 2015/0262230 A1* | 9/2015 | Cypher | ................. | G06F 16/955 705/14.49 |
| 2015/0278829 A1* | 10/2015 | Lu | ...................... | G06Q 30/0201 705/7.29 |
| 2016/0180404 A1* | 6/2016 | Stern | .................. | G06Q 30/0269 705/14.58 |
| 2018/0121939 A1* | 5/2018 | Eswaran | ............ | G06Q 30/0202 |

OTHER PUBLICATIONS

Yaeli, et al., "Understanding customer behavior using indoor location analysis and visualization", In IBM Journal of Research and Development, vol. 58, Issue 5-6, Sep. 2014, 21 pages.

Costa, Tony, "How Location Analytics Will Transform Retail", https://hbr.org/2014/03/how-location-analytics-will-transform-retail, Published on: Mar. 12, 2014, 5 pages.

"Customer Behavior Analytics based on Deep Packet Inspections data", https://www.infosys.com/data-analytics/insights/Documents/customer-behavior-analytics.pdf, Retrieved on: Jan. 7, 2017, 2 pages.

"Measuring Offline Consumer Behavior Understanding the Foundation of Location Measurement and Analytics", https://www.placed.com/pdf-download?action=resources_download&authenticity_token=7xSjpOkpF3SIg879J9BJ%2BjhYKx0HXXgfUoZ75q5G8%2FqsHzGsHSCLB%2F4Cr7SBIFcvgSSIv9Q2bV%2FCbRfxsBveBw%3D%3D&controller=page&pdf=resources%2Fwhite_papers%2FMeasuring-Offline-Consumer-Behavior-Placed&report=measuring_consumer_behavior&report_id=white_paper&source=Measuring+Offline+Behavior+Jan.

Nemeth, et al., "How Location Intelligence drives value in next-generation customer loyalty programs in Retail business", http://regconf.hse.ru/uploads/5cfd0bfbf1c97b67639140f60925feb58f25fe53.pdf, Retrieved on: Jan. 7, 2017, 8 pages.

Howe, Kathryn, "Beyond Big Data: How Next-Generation Shopper Analytics and the Internet of Everything Transform the Retail Business", In White Paper of Cisco, 2014, pages.

"Use Case: Mobile Coupons", http://www.cisco.com/c/dam/en/us/solutions/collateral/service-provider/mobile-internet-applications-services/at-a-glance-c45-731333.pdf, Retrieved on: Jan. 7, 2017, 2 pages.

Kayacan, Deniz, "The Retail Transformation Blog", http://www.javelingroup.com/blog/four_ways_to_drive_retail_in-store_sales_through_mobile/, Published on: Oct. 27, 2015, 8 pages.

* cited by examiner

TRIGGERING USER AID BASED ON USER ACTIONS AT INDEPENDENT LOCATIONS

BACKGROUND

A user's prior actions are often a useful indicator as to future actions the user might undertake. Accurate prediction of such future actions enables proactive presentation of information and other aid to facilitate the user's future actions. Alternatively, or in addition, accurate prediction of future user actions can enable the presentation of aid to encourage the user to act in a contrary manner, or to otherwise not perform the anticipated future action. The ubiquity with which users utilize computing devices, and rely on such computing devices to perform actions, proactive presentation of user aid can enable a user to be more efficient with a computing device while using such a computing device to perform actions. Moreover, the presentation of user aid through such a computing device provides a uniquely accurate mechanism through which the user can be proactively presented with relevant information, thereby not only making the user's utilization of the computing device to perform actions more efficient, but also decreasing the possibility that a user does not receive, or does not timely receive, information that can save the user resources.

Unfortunately, user actions are tracked in very insulated ways. For example, loyalty programs are independent of one another and each only obtains a limited sliver of information resulting in separate silos of information that do not accurately track user preferences and user behaviors. As another example, tracking of user actions in online environments, such as through search engines cookies, again only provides information regarding a very limited set of user interest that may not accurately reflect user intent or future actions of the user.

SUMMARY

User action data, quantifying the actions of the user in a physical establishment, can be obtained through multiple mechanisms, including various forms of tracking and monitoring that can be implemented by software or hardware infrastructure supported by physical establishment, and agreed to by the user. Such user action data can be obtained from multiple physical establishments, which, in combination with tracking of user actions in an online environment, can provide a more accurate basis on which to determine a user intent to act upon an item, a user's affinity for items associated with a specific entity, or combinations thereof. User intent can be quantified in terms of predetermined levels of intent which can range from a preliminary research level of intent, which can be equally applicable to multiple different items of a same type, to an imminent acquisition level of intent, which can be directed to a specific item. User entity affinity can be quantified on a predetermined scale, and predetermined metrics can be utilized to assign particular values to particular types of actions by the user. Such user intent and user entity affinity can provide a more accurate basis on which to proactively offer user aid to facilitate the user's acquiring of items, or otherwise make more efficient the user's activities with respect to such items.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the determination and quantification, from information about user actions at multiple different, independent locations, including physical establishments and online establishments, assessing user intent to act upon a specific item, other user's affinity towards items of a particular entity, or combinations thereof, including the subsequent presentation of user aid based upon such user affinity and user intent quantification. User action data, quantifying the actions of the user in a physical establishment, can be obtained through multiple mechanisms, including various forms of tracking and monitoring that can be implemented by software or hardware infrastructure supported by physical establishment, and agreed to by the user. Such user action data can be obtained from multiple physical establishments, which, in combination with tracking of user actions in an online environment, can provide a more accurate basis on which to determine a user intent to act upon an item, a user's affinity for items associated with a specific entity, or combinations thereof. User intent can be quantified in terms of predetermined levels of intent which can range from a preliminary research level of intent, which can be equally applicable to multiple different items of a same type, to a focused evaluation level of intent of few brands and models, to an imminent acquisition level of intent, which can be directed to a specific item. User entity affinity can be quantified on a predetermined scale, and predetermined metrics can be utilized to assign particular values to particular types of actions by the user. Such user intent and user entity affinity can provide a more accurate basis on which to proactively offer user aid to facilitate the user's acquiring of items, completing a transaction directed to such items, or otherwise make more efficient the user's activities with respect to such items.

The techniques described herein make reference to "establishments", including "physical establishments" and "online establishments". As utilized herein, the term "establishment" means a single place, either a physical place or a conceptual place in an online environment, which a user visits to act upon items that are made available to users at such places. Thus, retail stores, such as electronics stores, discount warehouse stores, furniture stores, grocery stores, and other types of stores, on one form of "physical establishments" as that term is utilized herein. However, while the term "establishment" includes retail locations, other places are equally contemplated and encompassed by that term, as defined herein. For example, a library is one type of "physical establishment" as that term is utilized herein, and the descriptions below are as equally applicable to libraries as they are to retail stores. As another example, gyms, training facilities, or other like recreational facilities are another type of "physical establishment" as that term is utilized herein, and the descriptions below are as equally applicable to gyms as they are to retail stores. With respect to the term "online establishment", a website is the most easily understood example of an "online establishment" as that term is utilized herein. However, as with "physical establishments", "online establishments" need not be directed to retail endeavors, and the mechanisms described herein are fully applicable irrespective whether such establishments are directed to sales of goods.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
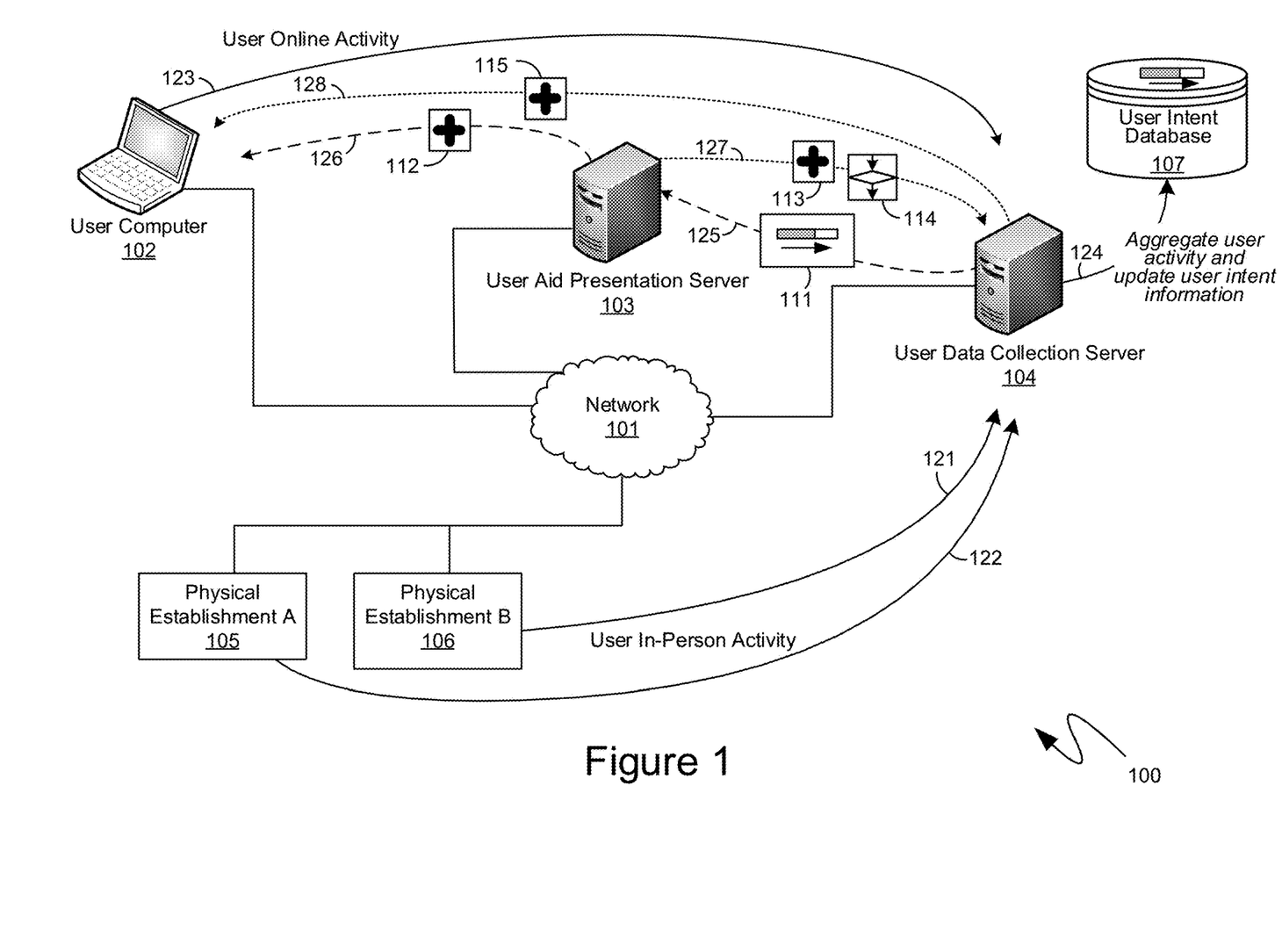
FIG. 1 is a system diagram of an exemplary system for providing user activity information across a network.

With reference to FIG. 1, an exemplary system 100 is illustrated, providing context for the descriptions below. The exemplary system 100 can include, but is not limited to, one or more user-controlled computing devices, such as the exemplary user computer 102, which can be communicationally coupled to the network 101. As will be described further below, a user can utilize the user computer 102 to communicate with other computing devices via the network 101. For example, the network 101 can represent the Internet, and the user can utilize the user computer 102 to visit webpages of one or more websites, such as in a manner detailed below.

Additionally, the exemplary system 100, shown in FIG. 1, can include two or more different, independent physical establishments, such as exemplary physical establishments 105 and 106, which can comprise computing devices that can be communicationally coupled to the network 101. As will be detailed further below, the computing infrastructure of various physical establishments, such as exemplary establishments 105 and 106, can include infrastructure capable of tracking a user who has consented to such tracking. Thus, for example, such infrastructure can include wireless communication infrastructure, an application that can execute on a mobile device, such as a smartphone, that the user can be carrying with them during their visit to the physical establishments 105 and 106, software, hardware, or combinations thereof that can be utilized by employees who work at such physical establishments, and other like infrastructure.

The exemplary system 100 can further include one or more user data collection servers, such as the exemplary user data collection server 104, which can also be communicationally coupled to the network 101. The user data collection servers can receive information from the infrastructure that one or more physical establishments, such as exemplary physical establishments 105 and 106, which can be indicative of user actions at such physical establishments, again, to the extent consented to by the user. Based on such user actions, user data collection servers can update user intent information, including user intent indicators associated with specific items and being indicative of an intent, by the user, to act upon such specific items in the future, and user entity affinity indicators, which can be indicative of an affinity for items associated with a particular entity. Such information can be maintained in a user intent database, such as the exemplary user intent database 107, which can be communicationally coupled to the user data collection servers, such as the exemplary user data collection server 104.

According to one aspect, user intent information can be utilized to provide information to the user that can aid the user in subsequent actions directed to items. Such aid can be in the form of incentives for the user to act upon specific items, as well as other mechanisms by which user action can be facilitated and made more efficient. Such user aid can be provided directly from one or more of the user data collection servers, such as the exemplary user data collection servers 104, based upon aid information received previously, whose presentation was contingent on predetermined circumstances, such as predetermined user intent indicator quantifications. Such aid information can be provided from one or more user aid presentation servers, such as the exemplary user aid presentation server 103, which can be communicationally coupled to the user data collection servers via the exemplary network 101. Alternatively, user intent information can be provided to the user aid presentation servers, whereupon such information can be utilized to trigger the presentation of user aid in accordance with predetermined circumstances associated with such aid.

Further descriptions of the operation of the exemplary system 100 shown in FIG. 1 can be provided to specific examples. While such examples contain reference to retail environments, the mechanisms described are equally applicable to nonretail implementations, such as libraries, gyms, and other like nonretail implementations. Thus, examples referencing retail environments are meant to be exemplary only, and are not meant to signify that the mechanisms described are specifically directed to such environments.

By way of one example, the physical establishment 105 can be an electronics store. A user visiting such an electronics store can carry with them a mobile computing device, such as the ubiquitous smart phone. Such a mobile computing device can be utilized to generate, in combination with infrastructure offered by the electronics store, in person activity, such as exemplary in-person activity 122. More specifically, the user is afforded the opportunity to choose whether or not to have their activity tracked. Such an offer can be made within the context of providing the user with defined benefits should the user agree to have their activity tracked. Such defined benefits can include proactive provision of information that is of interest to the user, that enables the user to be more efficient in their actions, that saves the user's resources, including both time and money, and other like defined benefits. One mechanism through which the user can be offered to choose to allow to have their activity tracked can be an application executing on the smart phone being carried by the user. Such an application can work with infrastructure within a physical establishment, such as the electronics store in the present example, and that infrastructure can include location determination equipment based on wireless signal triangulation, location determination equipment in the form of video cameras and other like visual tracking mechanisms, and other like infrastructure. The infrastructure provided by the physical establishment can also include infrastructure provided through human employees of the physical establishment, such as wearable cameras, or dedicated applications that can execute on mobile computing devices carried by such employees.

The in-person activity by the user while in a physical establishment, such as the electronics store of the present example, can be communicated to one or more user data collection servers, such as exemplary user data collection server 104, as illustrated by the communications 121 and 122. The data generated, quantifying the user's actions within the physical establishment, can include data indicative of the user simply walking around, or obtaining items that the user had already predetermined to obtain. The user action data can also include data quantifying the user standing in front of a particular item and considering such an item. For example, the user action data can indicate that the user spent several minutes standing in front of the display of digital cameras. In combination with the infrastructure referenced above, such user action data can be more detailed. For example, cameras within the physical establishment can provide user action data that indicates that the user actually interacted with a specific digital camera. As another example, applications executing on a mobile computing device carried by an employee of the physical establishment can indicate that the user asked such an employee for information regarding one or more specific digital cameras. As yet another example, applications executing on a mobile computing device carried by the user can generate user action data indicative of the user searching the Internet for additional information regarding one or more specific digital cameras.

According to one aspect, it is contemplated that the user data collection servers can receive user action data as the user visits multiple different, independent establishments. Such different, independent establishments can include online establishments, and other physical establishments. For example, the physical establishment 106 can be a warehouse club, or other like membership-based discount retail establishment. User action data from such a second, independent establishment can be amalgamated with the user action data received from the physical establishment 105, as detailed in the example above, to provide a greater corpus of data on which processing by the user data collection servers can be based. Continuing with the present example, for purposes of illustrating the operation of the mechanisms detailed herein, the warehouse club can also comprise infrastructure such as that described above. For example, the warehouse club can have its own application which can execute on the user's mobile computing device. Such a warehouse club application can separately provide the user with an opportunity to agree to being tracked, again, typically, in exchange for benefits to the user. While the warehouse club application can be independent of the electronic store application, both can generate user action data, in combination with infrastructure within the physical establishments themselves, and provide such interaction data in a common format to the user data collection servers. Alternatively, or in addition, user action data can be provided in multiple different formats, and the user data collection servers can execute computer executable instructions capable of receiving such user action data for multiple independent sources, in multiple different formats, and then amalgamate such data, such as will be detailed further below.

Continuing with the present example, the user action data collected from the warehouse club can further indicate that, for example, the user again spent several minutes standing proximate to the digital cameras. As another example, user action data collected from the warehouse club can further indicate that, for example, the user physically interacted a single, specific digital camera.

Turning to the operation of the user data collection servers, such operation will be detailed further below, however, for purposes of the exemplary system 100 of FIG. 1, the user data collection servers can aggregate, as illustrated by the arrow 124, user activity data received from multiple independent sources, and, through such an aggregation, update user intent information. User intent information can include user intent indicators associated with specific products. For example, a specific digital camera from a specific digital camera manufacturer will can have the user intent indicator associated with the indicating a level of intent that a specific user has to act upon, such as to purchase, that specific digital camera, from that specific digital camera manufacturer. Other, different digital camera, including different digital cameras from the same manufacturer, can have different user intent indicators associated with them, which can, again, indicate the level of intent that the same specific user has to act upon those different digital cameras.

User intent indicators can quantify user intent in terms of predetermined levels, or stages, of intent. According to one aspect, four predetermined levels, or stages, of intent can be utilized, progressing, in order, from an initial level at which the user has no defined intent to act upon a particular item, to a next subsequent level, which can be termed a "research level", at which the user is researching a particular item for purposes of future action directed to such an item, to a next subsequent level, which can be termed a "comparison level", at which the user is comparing the particular item to one or more other specific items, and then, lastly, to a level that can be termed an "imminent action level", at which the user is ready to act upon the item. According to other aspects, other quantities of predetermined levels, or stages, can be utilized including a fewer quantity of levels, such as two or three levels, and also including a greater quantity of levels, such as five, six, ten, or more levels.

Within the present example, user action directed to an item can be a purchase action. Thus, within the present example, the user's intent level with respect to specific digital cameras represents a quantification of the user's intent to purchase that specific digital camera that corresponds to the quantified user intent level. The user data collection servers, upon receiving the above described user action data can update the user intent indicators corresponding to specific digital cameras. For example, the user action data received from the electronics store infrastructure, or from an application executing on the user's mobile computing device that worked in conjunction with such infrastructure, can reveal that the user had spent time in a location proximate to one or more specific digital cameras within the electronics store. Such information can be utilized to update the user intent indicators corresponding to the specific digital cameras displayed by the electronics store proximate to the location the user spent time in.

According to one aspect, user action data can be filtered prior to being utilize to update user intent indicators. One method of filtering user action data can be to filter out, or otherwise remove, deprecate, or ignore, user action data that is not indicative of user interest towards a specific item. For example, user action data quantifying the user's action in merely walking from one portion of the electronics store to another is not indicative of user intent towards any specific item, and can be filtered out. As another example, user action data quantifying the user's action in standing in the middle of the electronics store while, for example, talking with a friend, can, likewise, not be indicative of user intent towards any specific item.

One mechanism of filtering user action data can be to only retain predetermined types of user action data. One such type of user action data that can be retained can be user action data that is simultaneously indicative of both the user remaining in a physical position for greater than a predetermined amount of time, and that that physical position is less than a predetermined distance from one or more items. Another type of user action data that can be retained can be user action data that is indicative of the user performing searches online for one or more items while the user is physically within a physical establishment, such as the electronics store in the present example. Another type of user action data that can be retained can be user action data that is indicative of the user receiving assistance from one or more associates, employees, professionals, or other like individuals within the physical establishment.

Upon filtering the user action data that quantifies the user actions within, for example, electronics store, the user data collection servers can utilize the filtered user action data to appropriately update one or more user intent indicators. For example, if the filtered user action data indicates that the user spent time proximate to some digital cameras in the electronics store, in the present example, then user intent indicators for each of the specific digital cameras to which the user was physically proximate can be updated to indicate a level of user intent, with respect to each of those digital cameras, commensurate with the expressed user interest. For example, if the user intent indicator expresses user intent within terms of four predefined levels of intent, such as those enumerated above, then the user intent indicator for each of those digital cameras can be updated to a "research level" level of intent. If the user intent indicator for some or all of those digital cameras was already at such a "research level" level of intent, then no further updates need be made. User action data from a second source can then be utilized to further update the user intent indicators.

More specifically, the user action data received from another source, including another physical establishment, such as the warehouse club in the present example, can be similarly filtered, and the filtered user action data can be utilized to further update the user intent indicators. According to one aspect, filtering applied to user action data can be specific to the particular sources of such user action. Thus, the user action data being received from electronics store, for example, can be filtered differently from user action data being received from, for example, a warehouse club. More specifically, and as indicated previously, one mechanism of filtering user action data can be to retain user action data quantifying the user remaining in a same physical location for greater than a predetermined amount of time, where that physical location is proximate to one or more items, with such proximity being measured based on a predetermined distance. Such predetermined amounts of time and predetermined distances are examples of filtering parameters that can be specific to a particular physical establishment. For example, users may spend more time choosing between various items in an electronics store than in a warehouse club. Consequently, the threshold amount of time can be higher for an electronics store than it is for a warehouse club. For example, user action data from an electronics store can be filtered such that user action data quantifying the user remaining in a same physical position for greater than five minutes can be retained, while user action data quantifying the user remaining in a same physical position for less than five minutes can be discarded, or otherwise not used. The five-minute threshold can be based on empirical data suggesting that users who are considering the sort of items typically sold by the electronic store spend at least five minutes considering such items if they are subsequently considering to act upon them, while users who spend less than five minutes are, empirically, less likely to act upon such items. By contrast, user action data from a warehouse club can be filtered such that user action data quantifying user remaining in the same physical position for greater than three minutes can be retained, while user action data quantifying the user remaining in the same physical position for less than three minutes can be discarded. Again, such a three-minute threshold to be based on empirical data suggesting that users who spend at least three minutes considering items in a warehouse club are, empirically, more likely to act upon such items.

Other analogous filtering parameters can likewise be tailored to specific physical establishments, or specific types of physical establishments. Other types of filtering parameters can include other thresholds of time, such as upper boundary thresholds of time. For example, electronics stores can comprise display devices, such as televisions, that are often set to show a movie or other like entertainment for purposes of advertising their visual fidelity. Empirical data may suggest that users who are not considering acting upon such display devices, but who have, for example, simply been forced to go to the electronics store by a companion, often spend 10 minutes or more in a same physical location that is physically proximate to such display devices. Thus, one form of filtering parameter can be an upper boundary such that user action data quantifying a user remaining in a same physical position, proximate to display devices that typically show movies were other like entertainment, for greater than 10 minutes, can be discarded.

Other types of filtering parameters can also include the physical locations of specific items, or specific types of items, so that user action data quantifying user actions in locations where there are no such items can be filtered out. Yet other types of filtering parameters can include a quantity of user motion within a predetermined amount of time, such as to account for a user pacing back and forth in front of, for example, two or more display devices that the user is considering acting upon, and a physical location threshold to such user motion, again to account for a similar scenario. Yet other filtering parameters can include concurrent actions, such as the user consulting with a sales associate while simultaneously remaining in a location that is physically proximate to an item for greater than a predetermined amount of time, or such as the user performing a search, such as on a mobile computing device carried by the user, while simultaneously remaining in a location that is physically proximate to an item for greater than a predetermined amount of time.

Once the user action data is filtered, the user data collection servers can update one or more user intent information, such as a user intent indicator, based upon the filtered user action data. According to one aspect, the updating of user intent indicators can be cumulative, based on an aggregation of user action data received from multiple different physical establishments that can be independent of one another, and can be different types of physical establishments, such as in the above example of an electronics store and a warehouse club. For example, returning to that example above, filtered user action data from an electronics store can indicate that the user spent time physically proximate to a couple of different digital cameras. In such an instance, the user data collection servers can update information in the user intent database 107 to comprise user intent indicators, associated with each of those different digital cameras, expressing a user intent in terms of one of the predetermined levels, such as the aforementioned "research level". Filtered user action data from the warehouse club, continuing with the above example, can indicate that the user physically interacted with two specific digital cameras. In such an instance, the user data collection servers can update information in the user intent database 107 such that the user intent indicators associated with only those two specific digital cameras are increased to a further intent level such as, for example, the aforementioned "comparison level".

As indicated, therefore, according to one aspect, a user intent indicator corresponding to a particular item can be updated to increasing levels of interest, or intends to act upon such an item, based upon repeated instances of conduct evidencing the user considering such an item. In such an aspect, the repeated incidents of conduct can be of a same type. Thus, for example, the user that continues to stand proximate to a specific digital camera every time they visit an electronics store, including different types of electronics stores, or different types of stores that carry such a digital camera, such repeated incidents of the same conduct can result in the user data collection servers continuing to increase the level of the user intent indicator associated with that digital camera. According to another aspect, different types of user action can be required to trigger an increase in the level of the user intent indicator. Thus, for example, in such an aspect, the user simply repeatedly standing proximate to a specific digital camera will not cause the user intent indicator associated with such a digital camera to increase beyond the, for example, aforementioned "research level". Instead, in such an aspect, a different type of user action, such as the user physically interacting with a digital camera, or the user requesting assistance for a specific digital camera from an associate of a physical establishment, can be required to trigger an increase in the user intent indicator.

According to one aspect, user intent indicators corresponding to items of a specific type can be reset when user action data is received indicative of the user having acted upon one item of the same time. Thus, in the above example, user intent indicators corresponding to digital cameras can be reset user action data is received indicative of the user having purchased a digital camera. According to another aspect, however, user intent indicators can remain at existing levels of intent, irrespective of user action towards one item of the same type. In such an aspect, user intent indicators can be reset, or decreased, based upon other factors, such as the passage of time since a last user action data indicative of user intent to act upon any item of the same time, or the specific item.

While the above descriptions have been provided within the context of a user intent indicator, another type of user intent information that can be maintained by the user data collection servers in the user intent database 107 can be user entity affinity indicators. According to one aspect, user entity affinity indicators can quantify an affinity of the user to the entity's items. Within the context of retail goods, entities can be brands, such that the user entity affinity indicator for a given brand quantifies the user's affinity for product of that brand as compared with the equivalent products of other brands. While entity affinity indicators can be understood within the context of brands and retail goods, they are not so limited. For example, entity affinity indicators can likewise be utilized to quantify a user's affinity for a specific author, a specific actor, a specific movie studio, a specific band, and the like.

According to one aspect, user entity affinity indicators can quantify, such as based on a relativistic scale, such as a scale from one to ten, or any other like numerical range, a user's affinity for an entity, such that one end of the scale reflects a user that is completely agnostic as to which entity is associated with items the users considering acting upon, while an opposite end of the scale reflects a user that refuses to consider even equivalent or identical items from other entities. As with the user intent indicators, user entity affinity indicators can be updated based upon user action data received from multiple independent sources, including multiple independent physical establishments, such as the exemplary physical establishments 105 and 106 shown in FIG. 1. For example, if the physical establishment 105 is a grocery store, user action data from such a grocery store can quantify the user's actions within such a grocery store including, for example, that the user visited the toothpaste aisle for only a short amount of time, and selected and purchased a particular toothpaste made by particular brand. Continuing with such an example, the physical establishment 106 can, again, being warehouse club, and user action data from such a warehouse club and quantify the user's actions within such a warehouse club including, for example, that the user purchased the same brand of toothpaste that the user had purchased at the grocery store.

As with the user intent indicators, user entity affinity indicators can be updated based upon user action data that is first filtered. Such filtering can include time-based filtering, such as that detailed the above. Within the context of user entity affinity, time-based filtering can also be based on time that is less than a predetermined threshold. For example, a user that selects an item for purchase after having spent less than thirty seconds, as an example, can have a higher entity affinity assigned to the entity of that item then a user who spends substantially more time considering various alternative items from different entities. Other forms of filtering can include incentive-based filtering. For example, user action data indicative of the user acting upon an item can have a higher relevance to user entity affinity if the user acted upon the item despite the fact that an equivalent item of a different entity was discounted, or the user was otherwise more incentivized to act upon. In such an instance, multiple different filtering can be applied, with an initial filtering revealing user action data indicative of user actions that are contrary to existing incentives, while subsequent filtering revealing additional user action data, such as user action data based on time-based factors.

According to one aspect, user entity affinity can be increased with each instance or each quantity of instances of a user acting upon an item of a given entity. Thus, for example, a user that purchases a same brand of toothpaste ten times can have a greater affinity for such a brand then a user who has purchased that same brand of toothpaste once or twice. According to another aspect, user entity affinity can be increased based on duration, such that, for example, a user that has purchased the same brand of toothpaste for five years can have a greater affinity for such a brand that a user who is purchased the same brand of toothpaste for only a year or two, either irrespective of a quantity of toothpaste purchased, or irrespective of the quantity of toothpaste purchased so long as it is greater than a threshold amount. According to another aspect, user entity affinity can be decreased with the passage of time since the last user action directed to an item of that entity. According to yet another aspect, user entity affinity can be decreased with each instance of user action directed to an equivalent item of a competitive, or alternative entity. As with the user intent indicator, a user entity affinity indicator can be more accurate as user action data is received, such as by user data collection servers, from multiple, independent sources, including multiple, independent physical establishments.

In some instances, user activity data may be inconclusive, incomplete or too sparse to enable generation of user intent information, including the aforementioned user intent indicators and the aforementioned user entity affinity indicators. In such instances, according to one aspect, interpolations and predictions can be made from a larger corpus of data that is not unique to the specific user, but rather comprises the accumulated data from many users. More specifically, machine learning techniques can be utilized to identify patterns in such accumulated data, which patterns can then be utilized to make predictive conclusions regarding specific users based on the user activity data of such users, even if such activity data is inconclusive, incomplete or too sparse to enable, by itself, generation of user intent information in accordance with the mechanisms described above. For example, user action data can be indicative of a user visiting a digital camera section of an electronics store for less than a minute. Such data, by itself, may be inconclusive or too sparse to trigger incrementing a user intent indicator associated with, for example, a specific digital camera. However, based on accumulated data from many users, machine learning can identify patterns, such as, for example, that users visiting specific types of items for brief periods are often interested in one specific item of that type and are merely checking whether that specific item has become available at that physical establishment. Continuing with such an example, the machine learning can also identify likely items that the user may have an intent to act upon based on recent activity patterns by other users, such as a specific digital camera that has very recently become available in some physical establishments but not others. In such an example, the user action data indicative of a user visiting a digital camera section of an electronics store for less than a minute can be utilized, in combination with machine learning analysis of accumulated data of other users, to predictively increment a user intent indicator associated with that specific, new digital camera, in the present example, that has not yet been made available at the particular electronics store that the user visited and within which the user generated the aforementioned user action data.

Turning back to FIG. 1, utilizing information from the user intent database 107, the exemplary system 100 illustrates the presentation of user aid to facilitate the user in acting upon one or more items. More specifically, and as illustrated in FIG. 1, the user data collection servers can receive, such as from one or more user aid presentation servers, such as the exemplary user aid presentation server 103, user aid that is provided with conditions upon which such user aid is to be presented to a user to facilitate users acting upon items. For example, the exemplary communication 127 indicates the provision of some form of user aid 113, together with a set of conditions 114, to the exemplary user data collection server 104, from the exemplary user aid presentation server 103. The conditions 114 can comprise conditions specified in terms of specific user intent indicators, user entity affinity indicators, or combinations thereof. For example, the conditions 114 can specify that the user aid 113 is to be presented to a user when a user intent indicator for a specific item, or a specific type of item, increases past a threshold amount. Returning to the above example, the conditions 114 can specify that user aid 113, such as in the form of a monetary incentive, such as a coupon, or other like discount, are to be presented to a user when a user intent indicator for a specific digital camera, or a specific brand of digital cameras, increases passed the threshold amount. The corresponding user aid 113 can be a monetary incentive to cause the user to purchase that specific digital camera, can be a monetary incentive to try to convince the user to purchase a competitive digital camera, or other like form of user aid associated with the conditions specified.

Upon receipt of a communication, such as exemplary communication 127, the user data collection servers and store the user aid 113 and the corresponding conditions 114, and, when user intent information, as maintained by the user data collection servers in the user intent database 107, matches the conditions 114, the user data collection servers can transmit the user aid to a user computing device, such as the exemplary user computing device 102, as illustrated by the communication 128. The user aid 115 is given a separate identifying number within FIG. 1 to illustrate that is a separate copy of the user aid 113.

Alternatively, user data collection servers, such as the exemplary user data collection server 104, can provide user intent information, such as the exemplary user intent information 111, which can be utilized by other computing devices, including for the triggering of the presentation of user aid. Thus, for example, as illustrated in FIG. 1, one or more user aid presentation servers, such as the exemplary user aid presentation server 103, can receive user intent information, such as the exemplary user intent information 111 and can, based on such user intent information 111, trigger the presentation of user aid 112, as illustrated by the communication 126. For example, the provision of user intent information 111, via communication 125, can be periodically initiated by the user data collection server 104. As another example, the communication 125 can be a responsive communication in response to an explicit request from the user a presentation server 103.

The presentation of user aid, whether by the communications 127 128, or by the communications 125 126, which are illustrated in FIG. 1 utilizing different forms of dashes to indicate that they are alternatives of one another, can be based on user intent information, allowing more focused presentation of user aid, thereby enabling the user to be more efficient and improving the user's experience. For example, user aid, such as in the form of a coupon, can be triggered based on user intent, thereby enabling the user to obtain items at a reduced cost while simultaneously enabling sellers of those items to incentivize a user that may otherwise not purchase the item, or may delay purchasing the item for an extended period of time.

According to one aspect, the user aid that is presented can be contingent upon geographic conditions to further incentivize the user. For example, a presented coupon can be redeemable only at physical establishments to incentivize the user to visit physical establishments as opposed to online retailers. As another example, a presented coupon can be redeemable only at specific physical establishments, such as exemplary physical establishment 105, to incentivize the user to return to a physical establishment at which the user initially performed actions that were suggestive of the user's intent to act upon an item.

As illustrated, user aid can be provided to the user through one or more computing devices utilized by the user, such as the exemplary user computing device 102. As will be recognized by those skilled in the art, the exemplary user computing device 102 may be any type of several types of user controlled devices including but not limited to a computer, tablet or smart phone. According to one aspect, the user can utilize the user computing device 102, to perform some form of user online activity 123 that can be sent through the network 101 to the user data collection server 104. For example, user online activity 123 can be the search for a product within an online establishment, or the perusal of specific webpages of the online establishment. In another example, user online activity 123 can be research, such at a website, or other like online establishment, maintained by a manufacturer of items, a reviewer of items, or other like websites. User online activity 123 can be utilized to update user intent information in the user intent database 107 in a manner analogous to that described above in connection with the in-person activity received from the user's actions within physical establishments. For example, user online activity can be filtered to identify webpages on which the user spent greater than a predetermined amount of time, which indicate the user interest in items displayed on those webpages. Other forms of filtering, analogous to those detailed above, can likewise be utilized.

According to one aspect, user online activity 123 can provide a basis through which user aid is visually presented to the user. For example, user aid can be in the form of an advertisement or other like visual presentation that is shown to the user as part of the user's online activity, such as by being displayed in a display area of a web browser executing on the user computer 102. As another example, user aid can be provided through dedicated applications, such as a coupon application, executing on the user computer 102. As yet another example, user aid can be provided through dedicated websites the user can visit when the user desires such aid.

Figure 2:
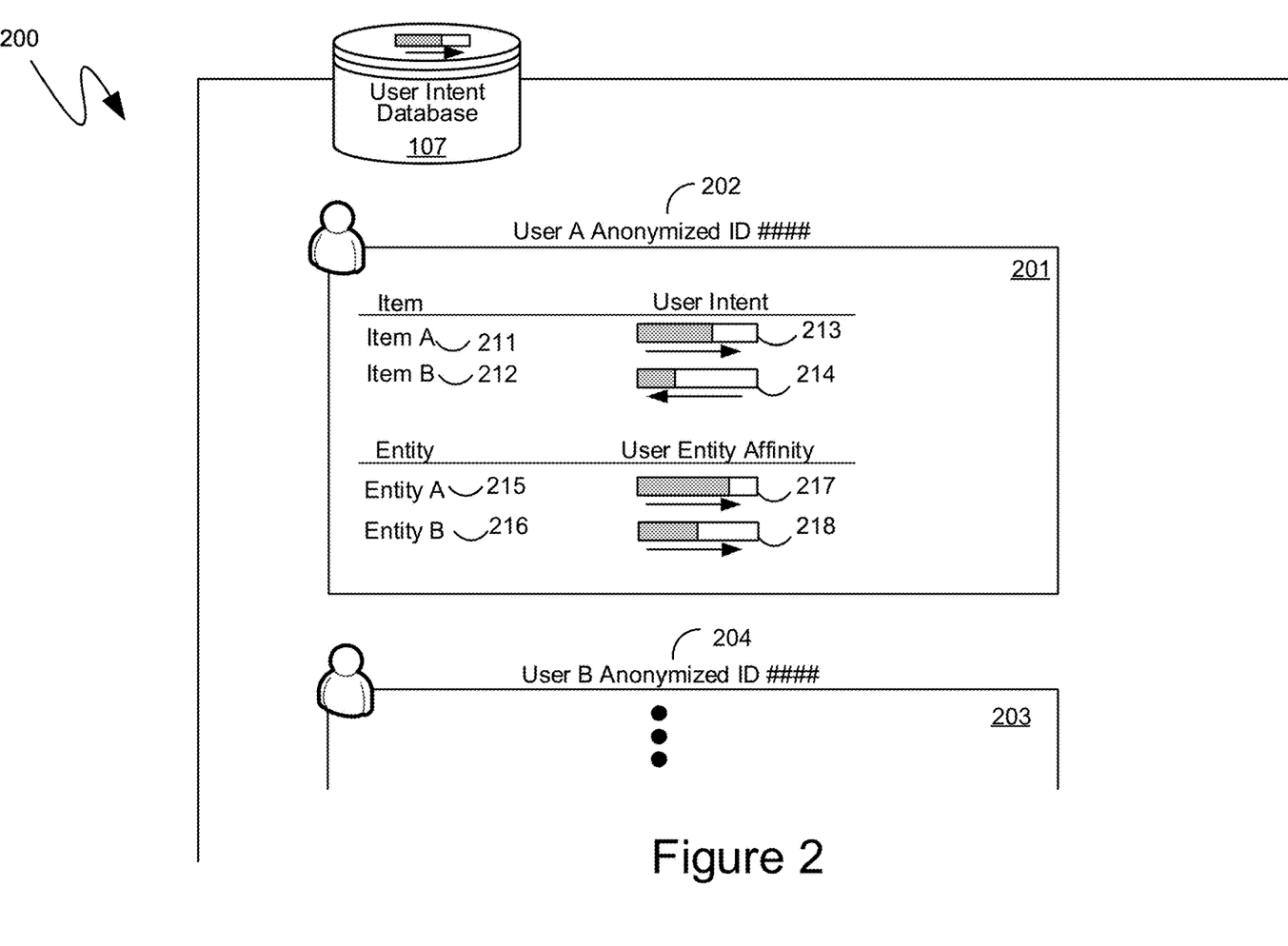
FIG. 2 is a block diagram of an anticipatory information server for storage of multiple users' intent and preferences.

Turning to FIG. 2, an exemplary organizational format of the aforementioned user intent database 107 is illustrated by the exemplary system 200 shown therein. More specifically, according to one aspect, the user intent database 107 can be organized in terms of identified users, such as exemplary users 202 and 203. As indicated previously, the mechanisms described herein require user authorization to track the user's activity. However, to further protect users' privacy, anonymize identifiers can be utilized. Such anonymous identifiers can lack any association with any other personally identifiable information of the user. Thus, for example, the exemplary user, whose user record 201 is shown in FIG. 2, can be identified with an anonymous identifier 202, but information such as the user's name, address, date of birth, government issued identifier, or any other like personally identifiable information can be absent from the user record 201.

According to one aspect, the user record 201 can comprise various user intent indicators, such as the exemplary user intent indicators 213 and 214, which can correspond to various items, such as the exemplary items 211 and 212. As indicated previously, user intent indicators can be associated with specific items, as opposed to categories of items. Thus, for example, the item 211 can be one specific model, or type of digital camera, and the item 212 can be another, different, specific model, or type of digital camera. Should the user be determined to be generally interested in digital cameras, or a specific subset of digital cameras, then user intent indicators for each of those individual digital cameras can be equally updated to reflect an equal level of user intent. As the user action data reveals that the user is focusing on a specific digital camera, for example, such as detailed in the example above, the user intent indicator for that specific digital camera can be increased, while the remainder of the user intent indicators need not be changed, or can be decreased, as also detailed above.

According to another aspect, user intent indicators can be hierarchically arranged. For example, the user intent indicator 213 can correspond to a user intent for a category, such as digital cameras, while subsequent user intent indicators, such as exemplary user intent indicator 214 can correspond to specific items within such a category, such as specific digital cameras. In such an instance, the item 211 can be a representation of a whole category, while the item 212 can be a specific instance of an item in such category. Still further layers of hierarchy are equally possible. For example, the category of digital cameras can have subcategories corresponding to individual plans of digital cameras, with still further sub categorization being reserved for individual, specific digital cameras themselves.

In addition to user intent indicators, a user record, such an exemplary record 201, can comprise user entity affinity indicators, such as the exemplary entity affinity indicators 217 and 218. According to one aspect, user entity affinity indicators can be maintained independently from the user intent indicators. And, as with user intent indicators, user entity affinity indicators can be maintained in association with the entities to which they correspond. Thus, for example, the user entity affinity indicator 217 can correspond to the affinity that the user, corresponding to the user record 201, has for the entity 215. Similarly, the user entity affinity indicator 218 can correspond to the affinity that the user has for the entity 216.

According another aspect, user entity affinity indicators can be maintained in conjunction with user intent indicators. Thus, for example, if the items 211 and 212 were specific digital cameras, then the entities 215 and 216 can be individual brands of digital cameras. Alternatively, or in addition, the user entity affinity indicators can be part of the above-described hierarchical arrangement of user intent indicators.

Figure 3:
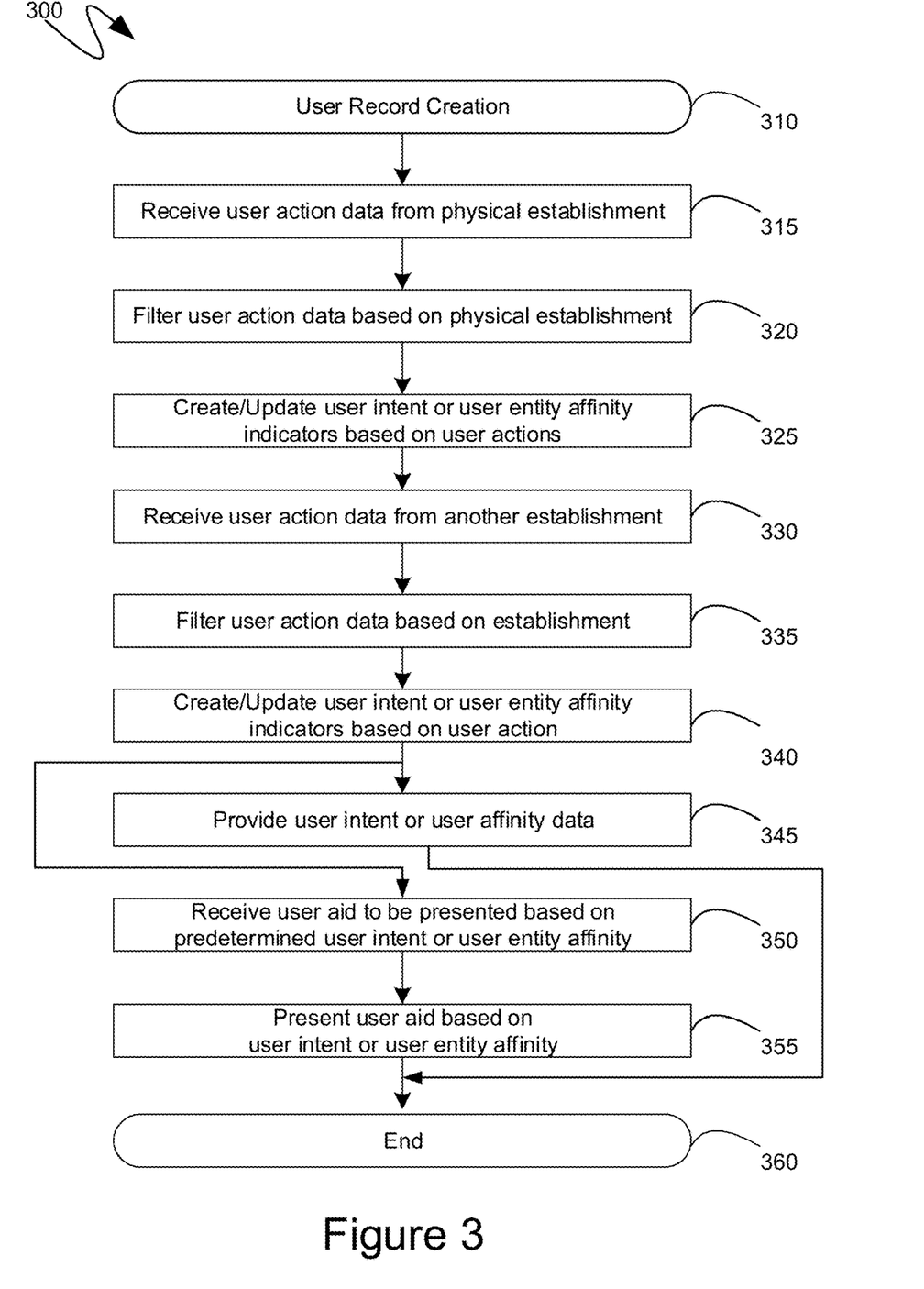
FIG. 3 is a flow diagram of an exemplary series of steps by which user intent can be calculated and provided across a network.

Turning to FIG. 3, the exemplary flow diagram 300 shown therein illustrates exemplary series of steps that can be performed, such as by the aforedescribed user data collection servers. Initially, at step 310, a user record can be created, such as for a new user. As detailed above, such a user record can be populated with user entity affinity indicators, user intent indicators, and other like information indicating user intent to act upon an item, or a set of items, such as the items of a particular entity. Subsequently, at step 315, user action data can be received, quantifying the user's actions within a physical establishment. Such user action data can be received from the infrastructure of the physical establishment itself, from mobile computing devices carried by the user, such as a ubiquitous smart phone, or combinations thereof. At step 320, such user action data can be filtered. One form of filtering, as detailed above, can be filtering based on thresholds of time that the user spent in a particular physical location. Another form of filtering, as also detailed above, can be filtering based on the user's physical location as compared with the physical location of items within the physical establishment. Yet another form of filtering can be filtering based on specific types of user actions, such as physical interaction with items, requesting assistance from an associate or employee of the physical establishment, and other like user actions. Still other forms of filtering can be combinations of the above-described filterings. As indicated previously, the filtering of the user action data, at step 320, can be specific to the physical establishment within which the user's actions were quantified by the user action data received at step 315.

At step 325, user intent indicators, user entity affinity indicators, or combinations thereof can be created or updated based on the filtered user action data of step 320. As detailed above, user intent indicators can quantify user interest in terms of predetermined levels, or stages, user intent to act upon a corresponding item. Consequently, the user intent indicator corresponding to a given item can be created when user action data is received that is indicative of at least the lowest level of user intent to act upon the corresponding item.

According to one aspect, specific types of user action can be deemed to correspond to specific levels, or stages, of user intent. Thus, for example, a user physically interacting with an item can correspond to a "research level" of user intent. In such an example, user action data indicative of a user physically interacting with an item can trigger the creation, or update, of a user intent indicator, corresponding to that item, such that that user intent indicator quantifies a "research level" of user intent. According to another aspect, cumulative quantities of user actions, or user actions across a defined period of time, can be deemed to correspond to specific levels, or stages, of user intent. Thus, for example, user action data that indicates that the user was physically proximate to an item for greater than a predetermined period of time, where such user action data is the fifth time that user action data indicative of the user's physical proximity to the item was received, can be a basis for updating a user intent indicator, or creating a user intent indicator for such an item if one does not already exist.

At step 330, user action data indicative of user actions within another, independent establishment can be received. The user action data, received at step 330, can be user action data indicative of user actions within an online establishment, such as the webpages visited by user on a particular website, the length of time the user browsed such webpages, the frequency with which the user returns to such webpages, the actions user performed on such webpages, such as comparison actions, interacting with images or three-dimensional models, and other like user actions. Alternatively, the user action data, received at step 330, can be user action data that is indicative of user actions within another physical establishment that is different from, and independent of the physical establishment corresponding to the user action data received at step 315. As utilized herein, the term "independent" means that the establishments in question do not share a common parent, owner, operator, manager, or other like supervisory entity. As yet another alternative, the user action data, received at step 330, can be user action data that is indicative of user actions within another physical establishment that is of the same type, such as a retail store that is from a same chain as a prior retail store, but is merely in a different physical location.

Subsequently, at step 335, the user action data received at step 330 can be filtered in a manner specific to the establishment at which the user perform the actions quantified by the user action data. At step 340, one or more user intent indicators, user entity affinity indicators, or combinations thereof can be created or updated based on the filtered user action data from step 335. In such a manner user intent information can be updated based upon user actions across multiple different, independent establishments.

Such user intent information can be utilized to trigger the presentation of user aid that can facilitate, make more efficient, or otherwise aid the user in acting upon one or more items. For example, user aid can be a coupon, discount, incentive, voucher, or other like user aid that can facilitate the user acting upon one or more items. The triggering of the presentation of user aid can be based on any conditional utilizing user intent information, since such conditionals can be established by the generators of user aid. More specifically, user aid can be utilized to encourage specific user behavior, such as to visit a specific physical establishment, act upon a specific item, or items of a given entity, or other like user behavior. Thus, for example, the presentation, to a user, of user aid to facilitate the user's purchase of a specific digital camera can be conditioned upon a user intent indicator corresponding to that specific digital camera reaching a predefined level, threshold, or rank of user intent. As another example, the presentation, to the user, of user aid to facilitate the user's purchase of that same specific digital camera can be conditioned upon a user intent indicator corresponding to a competitive digital camera, such as if the user is sought to be swayed in their decision. As yet another example, the presentation, to the user, of user aid to facilitate the user's purchase of that same specific digital camera can be conditioned upon a user intent indicator corresponding to items that may appear to be unrelated to digital cameras, but, based on empirical data, a digital camera manufacturer, or other like presenter of that user aid, may determine that there is a link between such items and subsequent users purchases of digital cameras, or subsequent decisions by users to explicitly not purchase digital cameras. Additionally, the presentation of user aid can facilitate user acting upon one or more items, not only for the benefit of entities with which those items are associated, but also for the benefit of establishments through which the user would act upon such items. For example, an electronics store benefits from the user's purchase of digital cameras at that electronics store, often irrespective of the specific digital camera, or specific brand of digital cameras, purchased. Thus, for example, user aid in the form of a coupon, voucher, discount, or other like incentive that is redeemable at a one specific electronics store, or a specific chain of electronics stores, or other like grouping of multiple stores, can be triggered based upon user intent indicators associated with any number of specific digital cameras since, again, a specific digital camera purchased can be irrelevant to an electronics store insofar as the benefits accruing to such a store. Again, while the examples provided herein have been within the retail environment, the mechanism described are not so limited and are equally applicable in other environments, including libraries, gyms, charitable organizations and events, and the like.

Turning back to the exemplary flow diagram 300 of FIG. 3, according to one aspect, user intent indicators, user entity affinity indicators, or combinations thereof can be proactively provided to one or more other computing devices that can trigger the presentation of user a conditioned upon such indicators. The proactive presentation of such user intent information can be triggered based on an elapsed time, such that the information is provided at a predetermined frequency or periodicity, or it can be triggered based on predetermined events, such as one or more user intent indicators, user entity affinity indicators, or combinations thereof changing, either at all or to a predetermined degree. The presentation of such user intent information is illustrated by step 345. Alternatively, the user aid to be presented, and the conditions under which such user aid is to be presented, can be received at step 350. Subsequently, at step 355, when user intent information is updated, such as in accordance with the prior steps, such user aid can be presented, such as by being transmitted to a computing device being utilized by the user and caused to be displayed on a display device that is communicationally coupled to such a computing device, as indicated at step 355. The relevant processing and then end at step 360.

Figure 4:
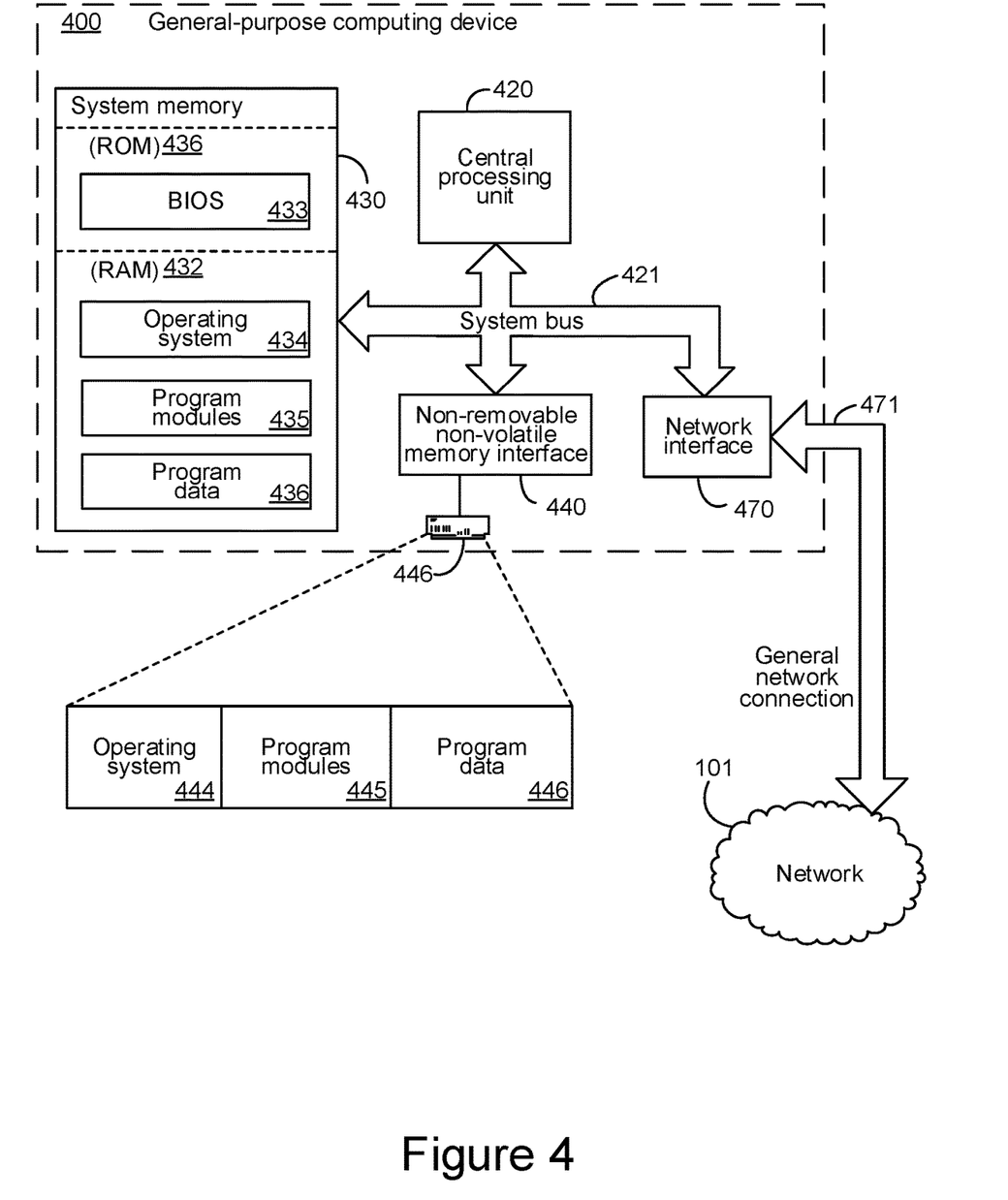
FIG. 4 is a block diagram of an exemplary computing device.

Turning to FIG. 4, an exemplary computing device 400 is illustrated which can perform some or all of the mechanisms and actions described above. The exemplary computing device 400 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, including, but not limited to, a graphics hardware interface 470 and a display device 471, which can include display devices capable of receiving touch-based user input, such as a touch-sensitive, or multi-touch capable, display device. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 400. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 436 and random access memory (RAM) 432. A basic input/output system 433 (BIOS), containing the basic routines that help to transfer content between elements within computing device 400, such as during start-up, is typically stored in ROM 436. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 446 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 446 is typically connected to the system bus 421 through a non-volatile memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 446 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 may operate in a networked environment using logical connections to one or more remote computers. The computing device 400 is illustrated as being connected to the general network connection 471 through a network interface or adapter 470, which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

Although described as a single physical device, the exemplary computing device 400 can be a virtual computing device, in which case the functionality of the above-described physical components, such as the CPU 420, the system memory 430, the network interface 470, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 400 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example is a set of one or more computing devices, in aggregate comprising: one or more processing units; and one or more computer-readable media comprising computer-executable instructions which, when executed by the one or more processing units, cause the set of computing devices to: receive a first set of user action data quantifying user actions of a user in a first physical establishment, the user actions in the first physical establishment comprising user actions directed towards a first item; filter the first set of user action data based on filtering criteria specific to the first physical establishment; update a first user intent indicator based on the filtered first set of data, the first user intent indicator quantifying, in terms of predetermined levels of intent, an intent of the user to obtain the first item; receive a second set of user action data quantifying either: (1) user actions of the same user while in a second physical establishment that is unaffiliated with the first physical establishment or (2) user actions of the same user in interacting with webpages of a website that is unaffiliated with the first physical establishment; filter the second set of user action data based on filtering criteria specific to either the second physical establishment or to the website, respectively; update the first user intent indicator based on the filtered second set of data; and cause a visual presentation, to the user, via a display device communicationally coupled to a computing device being utilized by the user, of a user aid that facilitates the user's obtaining the first item, the causing being based on the first user intent indicator.

A second example is the set of computing devices of the first example, wherein the first set of user action data comprises an anonymized user identifier that associates the first set of user action data with the user.

A third example is the set of computing devices of the first example, wherein a portion of the first set of user action data quantifies the user physically interacting with the first item.

A fourth example is the set of computing devices of the first example, wherein a portion of the first set of user action data quantifies the user asking an associate of the first physical establishment regarding the first item.

A fifth example is the set of computing devices of the first example, wherein a portion of the first set of user action data quantifies the user utilizing a computing device to research the first item.

A sixth example is the set of computing devices of the first example, wherein the filtering criteria specific to the first physical establishment comprise physical positions of items; and wherein further the computer-executable instructions causing the set of computing devices to filter the first set of user action data comprise computer-executable instructions which, when executed by the one or more processing units, cause the set of computing devices to retain only user action data corresponding to the user being at physical positions proximate to items for greater than a pre-determined duration of time.

A seventh example is the set of computing devices of the first example, wherein the filtering criteria specific to the first physical establishment further comprise the pre-determined duration of time, selected based on a type of the first physical establishment.

An eighth example is the set of computing devices of the first example, wherein the user aid facilitates the user obtaining the first item only at a single, specific physical establishment.

A ninth example is the set of computing devices of the eighth example, wherein the user aid facilitates the user obtaining the first item only at a single, specific physical establishment.

A tenth example is the set of computing devices of the first example, wherein the computer-executable instructions causing the set of computing devices to cause the visual presentation of the anticipatory information comprise computer-executable instructions which, when executed by the one or more processing units, cause the set of computing devices to: receive the user aid together with corresponding conditions expressed in terms of the predetermined levels of intent and based on the first user intent indicator; determine that the first user intent indicator matches the corresponding conditions; and transmit, based on the determining, the user aid to the user.

An eleventh example is the set of computing devices of the first example, wherein the computer-executable instructions causing the set of computing devices to cause the visual presentation of the user aid comprise computer-executable instructions which, when executed by the one or more processing units, cause the set of computing devices to provide the user intent indicator to another set of one or more computing devices, the other set of one or more computing devices transmitting the user aid to the user based on the received user intent indicator.

A twelfth example is a set of one or more computing devices comprising: one or more processing units; and one or more computer-readable media comprising computer-executable instructions which, when executed by the one or more processing units, cause the set of computing devices to: receive a first set of user action data quantifying user actions of a user in a first physical establishment, the user actions in the first physical establishment comprising user actions directed towards one of a first entity's items; filter the first set of user action data based on filtering criteria specific to the first physical establishment; update a first user entity affinity indicator based on the filtered first set of data, the first user entity affinity indicator quantifying an affinity of the user to the first entity's items; receive a second set of user action data quantifying user actions of the same user in a second physical establishment that is unaffiliated with the first physical establishment, the user actions in the second physical establishment comprising user actions directed towards a second item; filter the second set of user action data based on filtering criteria specific to the second physical establishment; update the first user entity affinity indicator based on the filtered second set of data; and cause a visual presentation, to the user, via a display device communicationally coupled to a computing device being utilized by the user, of a user aid that facilitates the user's obtaining of either the first entity's items or a second entity's items, the second entity being associated with items that are alternatives to items that are associated with the first entity, the causing being based on the first user entity affinity indicator.

A thirteenth example is the set of computing devices of the twelfth example, wherein the second item is one of the second entity's items.

A fourteenth example is the set of computing devices of the twelfth example, wherein the one or more computer-readable media comprise further computer-executable instructions which, when executed by the one or more processing units, cause the set of computing devices to update a second user entity affinity indicator based on the filtered first set of data, the second user entity affinity indicator quantifying an affinity of the user to the second entity's items.

A fifteenth example is the set of computing devices of the twelfth example, wherein the filtering criteria specific to the first physical establishment comprise inducements, offered by the first physical establishment, to induce the user to either act upon the one of the first entity's items, or to act upon an equivalent one of the second entity's items.

A sixteenth example is the set of computing devices of the twelfth example, wherein a portion of the first set of user action data quantifies a quantity of time the user spent proximate to the one of the first entity's items prior to acting upon the one of the first entity's items.

A seventeenth example is the set of computing devices of the twelfth example, wherein the user aid facilitates the user's obtaining of either the first entity's items or the second entity's items only at a single, specific physical establishment.

An eighteenth example is the set of computing devices of the twelfth example, wherein the computer-executable instructions causing the set of computing devices to cause the display of the user aid comprise computer-executable instructions which, when executed by the one or more processing units, cause the set of computing devices to: receive the user aid together with corresponding conditions that are based on the first user entity affinity indicator; determine that the first user entity affinity indicator matches the corresponding conditions; and transmit, based on the determining, the user aid to the user.

A nineteenth example is the set of computing devices of the twelfth example, wherein the computer-executable instructions causing the set of computing devices to cause the display of the user aid comprise computer-executable instructions which, when executed by the one or more processing units, cause the set of computing devices to provide the user entity affinity indicator to another set of one or more computing devices, the other set of one or more computing devices transmitting the user aid to the user based on the received user entity affinity indicator.

A twentieth example is a method of displaying user aid on a physical display device that is communicationally coupled to a computing device being utilized by the user, the user aid facilitating the user's obtaining of an item, the method comprising: receiving a first set of user action data quantifying user actions of a user in a first physical establishment, the user actions in the first physical establishment comprising user actions directed towards a first item, associated with a first entity; filtering the first set of user action data based on filtering criteria specific to the first physical establishment; updating, based on the filtered first set of data, at least one of: (1) a first user intent indicator that quantifies, in terms of predetermined levels of intent, an intent of the user to obtain the first item or (2) a first user entity affinity indicator that quantifies an affinity of the user to the first entity's items; receiving a second set of user action data quantifying either: (1) user actions of the same user while in a second physical establishment that is unaffiliated with the first physical establishment, the user actions in the second physical establishment comprising user actions directed towards a second item or (2) user actions of the same user in interacting with webpages of a website that is unaffiliated with the first physical establishment; filtering the second set of user action data based on filtering criteria specific to either the second physical establishment or to the website, respectively; updating, based on the filtered second set of data, at least one of: (1) the first user intent indicator or (2) the first user entity affinity indicator; and initiating, based on the first user intent indicator, a visual presentation, to the user, via a display device communicationally coupled to a computing device being utilized by the user, of a user aid that facilitates the user's obtaining of at least one of: (1) the first item, (2) the first entity's items or (3) a second entity's items, wherein the second entity is associated with items that are alternatives to items that are associated with the first entity.

As can be seen from the above descriptions, mechanisms for aggregating user actions across multiple independent establishments and deriving therefrom user intent information have been presented. In view of the many possible variations of the subject matter described herein, we claim as our invention all such embodiments as may come within the scope of the following claims and equivalents thereto.

We claim:

1. A set of one or more computing devices, in aggregate comprising:
   one or more processing units; and
   one or more computer-readable storage media comprising computer-executable instructions which, when executed by the one or more processing units, cause the set of computing devices to:
   receive a first set of user action data quantifying user actions of a user in a first physical establishment, associated with a first company, the user actions in the first physical establishment comprising user actions directed towards a first item;
   filter the first set of user action data based on a first set of thresholds that are empirically derived, at least in part, from prior actions of other users at physical establishments associated with the first company;
   update a first user intent indicator to a first predetermined level of intent based on the filtered first set of data, the first predetermined levels of intent quantifying an intent of the user to obtain the first item;
   receive a second set of user action data quantifying user actions of the same user while in a second physical establishment associated with a second company that differs from the first company;
   filter the second set of user action data based on a second set of thresholds that are empirically derived, at least in part, from prior actions of other users at physical establishments associated with the second company, the second set of thresholds being different quantities than the first set of thresholds, wherein the difference in quantities is based on empirically derived differences between user behavior at physical establishments associated with the first company and user behavior at physical establishments associated with the second company;

update the first user intent indicator to a second predetermined level of intent based on an amalgamation of the filtered first set of data and the filtered second set of data, the second predetermined level of intent differing from the first predetermined level of intent; and cause a visual presentation, to the user, via a display device communicationally coupled to a computing device being utilized by the user, of a user aid that facilitates the user's obtaining the first item, the causing being triggered by one of the updates to the first user intent indicator.

2. The set of computing devices of claim 1, wherein the first set of user action data comprises an anonymized user identifier that associates the first set of user action data with the user.

3. The set of computing devices of claim 1, wherein a portion of the first set of user action data quantifies the user physically interacting with the first item.

4. The set of computing devices of claim 1, wherein a portion of the first set of user action data quantifies the user asking an associate of the first physical establishment regarding the first item.

5. The set of computing devices of claim 1, wherein a portion of the first set of user action data quantifies the user utilizing a computing device to research the first item.

6. The set of computing devices of claim 1, wherein the first set of thresholds comprise physical positions of the user in comparison to physical positions of items in the first physical establishment; and wherein further the computer-executable instructions causing the set of computing devices to filter the first set of user action data comprise computer-executable instructions which, when executed by the one or more processing units, cause the set of computing devices to retain only user action data corresponding to the user being at physical positions proximate to items for greater than a pre-determined duration of time.

7. The set of computing devices of claim 6, wherein the first set of thresholds specific to the first physical establishment further comprise the pre-determined duration of time.

8. The set of computing devices of claim 1, wherein the user aid facilitates the user obtaining the first item only at physical establishments.

9. The set of computing devices of claim 8, wherein the user aid facilitates the user obtaining the first item only at a single, specific physical establishment.

10. The set of computing devices of claim 1, wherein the computer-executable instructions causing the set of computing devices to cause the visual presentation of the user aid comprise computer-executable instructions which, when executed by the one or more processing units, cause the set of computing devices to:

receive the user aid together with corresponding conditions expressed in terms of the predetermined levels of intent and based on the first user intent indicator;

determine that one of the updates to the first user intent indicator caused the first user intent indicator to satisfy the corresponding conditions; and transmit, based on the determining, the user aid to the user.

11. The set of computing devices of claim 1, wherein the computer-executable instructions causing the set of computing devices to cause the visual presentation of the user aid comprise computer-executable instructions which, when executed by the one or more processing units, cause the set of computing devices to provide the first user intent indicator to another set of one or more computing devices, the other set of one or more computing devices transmitting the user aid to the user based on the received first user intent indicator.

12. A set of one or more computing devices, in aggregate comprising:

one or more processing units; and one or more computer-readable storage media comprising computer-executable instructions which, when executed by the one or more processing units, cause the set of computing devices to:

receive a first set of user action data quantifying user actions of a user in a first physical establishment, associated with a first company, the user actions in the first physical establishment comprising user actions directed towards one of a first entity's items;

filter the first set of user action data based on a first set of thresholds that are empirically derived, at least in part, from prior actions of other users at physical establishments associated with the first company;

update a first user entity affinity indicator to a first predetermined level of entity affinity based on the filtered first set of data, the first predetermined level of entity affinity quantifying an affinity of the user to the first entity's items;

receive a second set of user action data quantifying user actions of the same user in a second physical establishment associated with a second company that differs from the first company, the user actions in the second physical establishment comprising user actions directed towards a second item;

filter the second set of user action data based on a second set of thresholds that are empirically derived, at least in part, from prior actions of other users at physical establishments associated with the second company, the second set of thresholds being different quantities than the first set of thresholds, wherein the difference in quantities is based on empirically derived differences between user behavior at physical establishments associated with the first company and user behavior at physical establishments associated with the second company;

update the first user entity affinity indicator to a second predetermined level of entity affinity based on an amalgamation of the filtered first set of data and the filtered second set of data, the second predetermined level of entity affinity differing from the first predetermined level of entity affinity; and cause a visual presentation, to the user, via a display device communicationally coupled to a computing device being utilized by the user, of a user aid that facilitates the user's obtaining of either the first entity's items or a second entity's items, the second entity being associated with items that are alternatives to items that are associated with the first entity, the causing being triggered by one of the updates to the first user entity affinity indicator.

13. The set of computing devices of claim 12, wherein the second item is one of the second entity's items.

14. The set of computing devices of claim 12, wherein the one or more computer-readable media comprise further computer-executable instructions which, when executed by the one or more processing units, cause the set of computing devices to update a second user entity affinity indicator based on the filtered first set of data, the second user entity affinity indicator quantifying an affinity of the user to the second entity's items.

15. The set of computing devices of claim 12, wherein the first set of thresholds comprise indications of whether any inducements were offered by the first physical establishment to induce the user to either act upon the one of the first entity's items, or to act upon an equivalent one of the second entity's items.

16. The set of computing devices of claim 12, wherein a portion of the first set of user action data quantifies a quantity of time the user spent proximate to the one of the first entity's items prior to acting upon the one of the first entity's items.

17. The set of computing devices of claim 12, wherein the user aid facilitates the user's obtaining of either the first entity's items or the second entity's items only at a single, specific physical establishment.

18. The set of computing devices of claim 12, wherein the computer-executable instructions causing the set of computing devices to cause the display of the user aid comprise computer-executable instructions which, when executed by the one or more processing units, cause the set of computing devices to:
    receive the user aid together with corresponding conditions that are based on the first user entity affinity indicator;
    determine that one of the updates to the first user entity affinity indicator caused the first user affinity indicator to satisfy the corresponding conditions; and
    transmit, based on the determining, the user aid to the user.

19. The set of computing devices of claim 12, wherein the computer-executable instructions causing the set of computing devices to cause the display of the user aid comprise computer-executable instructions which, when executed by the one or more processing units, cause the set of computing devices to provide the user entity affinity indicator to another set of one or more computing devices, the other set of one or more computing devices transmitting the user aid to the user based on the received user entity affinity indicator.

20. A method of displaying user aid on a physical display device that is communicationally coupled to a computing device being utilized by the user, the user aid facilitating the user's obtaining of an item, the method comprising:
    receiving a first set of user action data quantifying user actions of a user in a first physical establishment, associated with a first company, the user actions in the first physical establishment comprising user actions directed towards a first item, associated with a first entity;
    filtering the first set of user action data based on a first set of thresholds that are empirically derived, at least in part, from prior actions of other users at physical establishments associated with the first company;
    updating, based on the filtered first set of data, at least one of: (1) a first user intent indicator to a first predetermined level of intent quantifying an intent of the user to obtain the first item or (2) a first user entity affinity indicator to a first predetermined level of entity affinity that quantifies an affinity of the user to the first entity's items;
    receiving a second set of user action data quantifying user actions of the same user while in a second physical establishment associated with a second company that differs from the first company, the user actions in the second physical establishment comprising user actions directed towards a second item;
    filtering the second set of user action data based on a second set of thresholds that are empirically derived, at least in part, from prior actions of other users at physical establishments associated with the second company, the second set of thresholds being different quantities than the first set of thresholds, wherein the difference in quantities is based on empirically derived differences between user behavior at physical establishments associated with the first company and user behavior at physical establishments associated with the second company;
    updating, based on an amalgamation of the filtered first set of data and the filtered second set of data, at least one of: (1) the first user intent indicator to a second predetermined level of intent or (2) the first user entity affinity indicator to a second predetermined level of entity affinity; and
    initiating a visual presentation, to the user, via a display device communicationally coupled to a computing device being utilized by the user, of a user aid that facilitates the user's obtaining of at least one of: (1) the first item, (2) the first entity's items or (3) a second entity's items, wherein the second entity is associated with items that are alternatives to items that are associated with the first entity, the initiating being caused by one of the updates to either the first user intent indicator or the first user affinity indicator.

* * * * *